(12) United States Patent
Uchikawa et al.

(10) Patent No.: US 7,654,196 B2
(45) Date of Patent: Feb. 2, 2010

(54) ELECTRIC FIELD FORMING APPARATUS FOR A FRYER

(75) Inventors: Mamoru Uchikawa, Tokyo (JP); Atsushi Suzuki, Tokyo (JP)

(73) Assignee: E-Science Incorporated, Tokyo (JP)

( * ) Notice: Subject to any disclaimer, the term of this patent is extended or adjusted under 35 U.S.C. 154(b) by 812 days.

(21) Appl. No.: 11/243,178

(22) Filed: Oct. 5, 2005

(65) Prior Publication Data

US 2006/0130674 A1    Jun. 22, 2006

(30) Foreign Application Priority Data

Oct. 6, 2004    (JP)    ............... 2004-321271

(51) Int. Cl.
    *A47J 37/12*    (2006.01)
(52) U.S. Cl. .............. 99/451; 99/330; 99/331; 99/358; 99/403; 219/430; 219/439; 426/237; 426/438
(58) Field of Classification Search ........... 99/326–358, 99/403–418, 451, 444–450, 483, DIG. 14; 219/401, 400, 494–498, 430, 439; 422/22–24; 363/51, 52; 426/233–244, 438, 523, 237
    See application file for complete search history.

(56) References Cited

U.S. PATENT DOCUMENTS

| | | | | |
|---|---|---|---|---|
| 5,276,394 A | * | 1/1994 | Mayfield | ............ 323/356 |
| 5,588,357 A | * | 12/1996 | Tomikawa et al. | ............ 99/451 |
| 5,690,978 A | * | 11/1997 | Yin et al. | ............ 426/237 |
| 6,050,178 A | * | 4/2000 | Uemura | ............ 99/451 |
| 6,138,555 A | * | 10/2000 | Hata | ............ 99/451 |
| 6,590,187 B1 | | 7/2003 | Kaneko | ............ 219/430 |

FOREIGN PATENT DOCUMENTS

| | | |
|---|---|---|
| JP | 07099900 | 4/1995 |
| JP | 08056849 | 3/1996 |
| JP | 2000248291 | 9/2000 |
| JP | 2001095695 | 4/2001 |
| JP | 2001252026 | 9/2001 |
| JP | 2004041531 | 2/2004 |

* cited by examiner

*Primary Examiner*—Timothy F. Simone
(74) *Attorney, Agent, or Firm*—Michael Tobias

(57) ABSTRACT

An electric field forming apparatus for a fryer includes an electrode which is disposed along an inner wall surface of an oil vat, and a power supply which supplies an alternating current at a frequency higher than a power line frequency to the electrode.

17 Claims, 5 Drawing Sheets

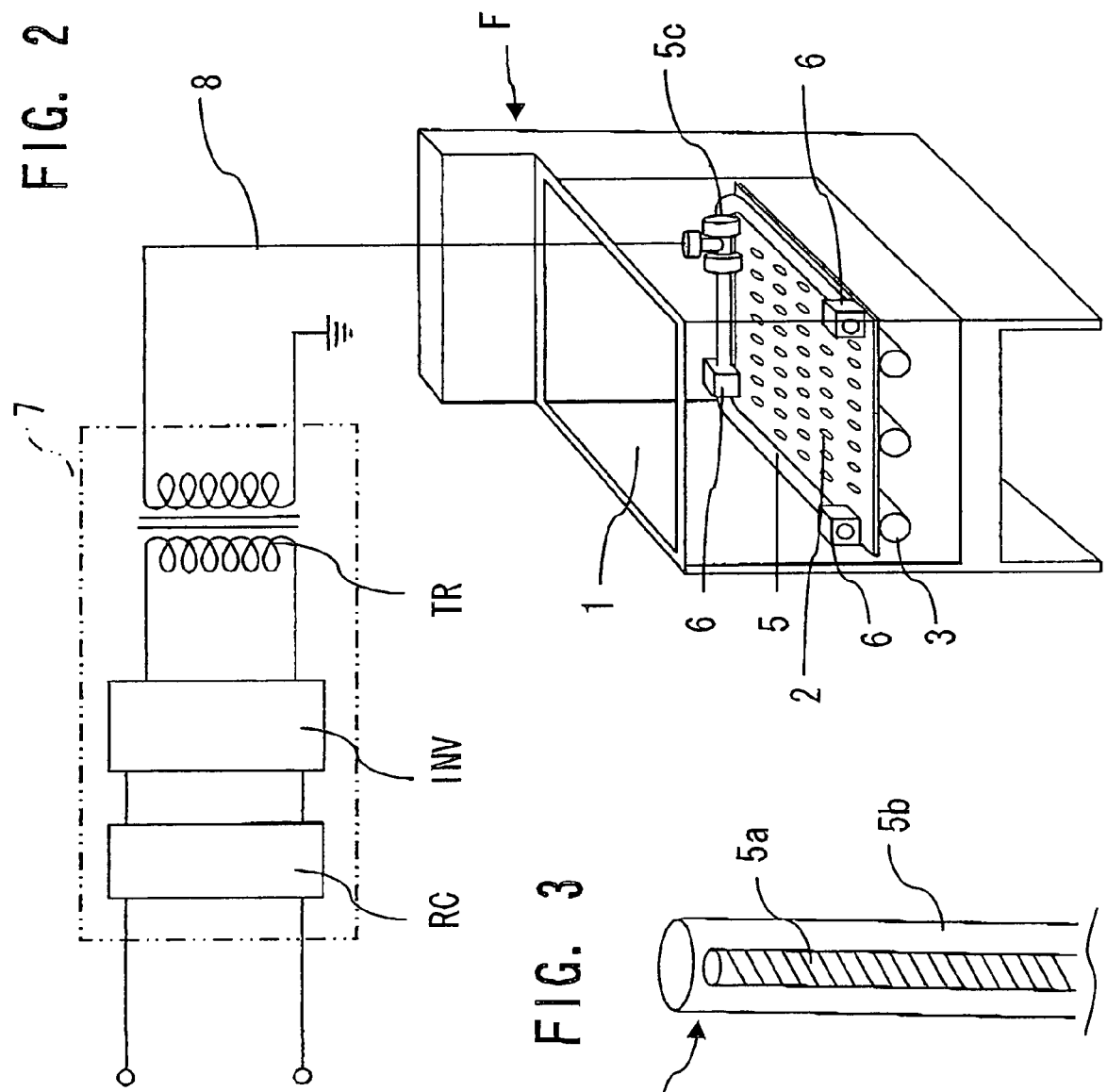

ELECTRIC FIELD FORMING APPARATUS FOR A FRYER

BACKGROUND OF THE INVENTION

This invention relates to an electric field forming apparatus for use in a fryer for frying food. More particularly, it relates to an electric field forming apparatus for a fryer which applies a high voltage to an electrode disposed in an oil vat and generates an electric field in the oil vat. It also relates to a fryer which utilizes this electric field forming apparatus and to a method of frying food.

As described in Japanese Published Unexamined Patent Application 2001-95695, it has been proposed to dispose a flat electrode at the bottom of an oil vat of a fryer and to apply a high voltage to the electrode to form an electric field within the oil vat. Forming an electric field in an oil vat is said to provide benefits such as suppressing oxidation of oil in the vat, preventing contamination, and shortening the frying time. These benefits are thought to be primarily due to the electric field producing forced convention of oil in the oil vat, which promotes the transmission of heat to food and produces concentrated heating of the surface of the food. This results in rapid frying of the surface of the food and trapping of moisture within the food. Since moisture is prevented from flowing into the oil, an oxidation reaction between oxygen in the moisture and oil is prevented. It has also been proposed to detachably install a flat electrode parallel to a side wall of an oil vat (see Japanese Published Unexamined Patent Application No. 2004-41531).

However, the electric field forming apparatus described in Japanese Published Unexamined Patent Application 2001-95695 has a structure such that the bottom portion of an oil vat of a fryer is electrically charged by an electrode which extends over the entire bottom surface of the oil vat, so food which is placed into the oil vat adheres to the bottom inner surface of the oil vat. Convection of oil is insufficient in locations where adhesion of food takes place, so the effect of promoting uniform heat transmission by the electric field cannot be obtained. In particular, heating of the surface of food facing the bottom surface of the oil vat is delayed, and unfried portions end up forming in the food. In the electric field forming apparatus described in Japanese Published Unexamined Patent Application 2004-41531, a flat electrode is disposed parallel to a side wall of an oil vat, so the problem of adhesion of food to the bottom of the oil vat is avoided, but since the electrode extends along a vertical surface of the oil vat, the efficiency of the electrode is poor, and adequate heat convection to the underside of food cannot be produced. Namely, in order to obtain a uniform fried state, it is important to generate a strong electric field in the vicinity of the bottom of the oil vat, but with the electric field forming apparatus described in Japanese Published Unexamined Patent Application 2004-41531, the electrode spreads in the vertical direction along a side wall of the oil vat, so an electric field cannot be concentrated at the bottom portion of the oil vat, and the electric field which is generated cannot be effectively utilized. Therefore, the desired effect of applying an electric field to oil in an oil vat cannot be adequately obtained.

SUMMARY OF THE INVENTION

The present inventors found that by disposing an elongated electrode along an inner wall surface of an oil vat and applying an alternating current voltage having a higher frequency than a power line frequency (which refers to the frequency of standard household electric power, which is typically 50 or 60 Hz) to the electrode, adhesion between food and the bottom surface of the oil vat can be avoided, sufficient heat convection can be produced even on the bottom side of food to obtain a uniform fried state in the food, and at the same time deterioration of oil in the oil vat can be prevented. It was also found that the application of a high frequency alternating current to an electrode promotes heat transmission within the oil vat, and frying time can be shortened.

When an alternating current at a power line frequency is applied to an electrode, as the distance from the electrode increases, the electric field strength greatly decreases, and a desired electric field strength is not obtained at the center of the oil vat. In particular, when the electrode is coated with an insulating layer for reasons of safety, this problem of a decrease in electric field strength becomes even more marked. FIGS. 1A and 1B show the results of measurements of the electric field strength at the surface of an electrode and at the center of an oil vat when an electrode used in the present invention measuring approximately 22 cm wide and approximately 27 cm long was installed in a commercial fryer having an oil vat measuring approximately 15 cm tall, approximately 23 cm wide, and approximately 29 cm long. FIG. 1A shows the electric field strength when an AC voltage of 5374 volts at a power line frequency of 50 Hz was applied to the electrode, and FIG. 1B shows the electric field strength when an AC voltage of 5445 volts at 12 kHz was applied to the electrode. As is clear from these figures, when an alternating current at a power line frequency was applied to the electrode, the electric field strength at the center of the oil vat was only 49 volts, whereas when a 12 kHz alternating current was applied to the electrode, the electric field strength at the center of the oil vat was 268 volts or roughly 5 times as high. Due to the higher voltage at the center of the oil vat, it is thought that the effects of the electric field such as promotion of heat transmission within the oil vat are more uniformly obtained over the entirety of the oil vat.

Thus, the present invention provides an improved electric field forming apparatus for use in a fryer which heats oil in an oil vat to a frying temperature so as to fry food placed into the oil vat. According to one form of the invention, the electric field forming apparatus includes an elongated electrode installed along an inner wall surface of the oil vat, and a power supply which supplies an alternating current at a frequency higher than a power line frequency to the electrode.

In one embodiment, the electrode comprises an elongated metal rod coated with an insulating layer. It can be installed on a partition (a screen disposed inside the oil vat for preventing food from falling to the bottom of the oil vat) within the oil vat while supported by a plurality of support members so as not to contact the side walls or the bottom surface of the oil vat. A recess can be provided in the partition, and the electrode can be installed in the recess while being supported so as not to contact the interior surfaces of the recess.

In another embodiment, the electrode comprises an elongated insulating body and an elongated metal rod which is disposed in the insulating body with a portion of the metal rod exposed to the exterior of the electrode. The electrode may be installed on a side wall of the oil vat by means of a plurality of support members. The exposed portion of the metal rod may have a projection which projects towards the exterior of the electrode. Such a structure is suitable when the generation of a strong electric field is required in a large fryer such as a continuous fryer and when there is no possibility of electric shock to an operator of the fryer by contact with the exposed portion of the electrode.

The insulating layer, the insulating body, and the support members are preferably made of Teflon (polytetrafluoroethylene). Teflon not only has excellent heat resistance and oil resistance, but it also has excellent formability, so it is suitable for forming an insulating layer for the electrode, an insulating body, or a support member.

The frequency of the alternating current applied to the electrode can be determined based on factors such as the size of the oil vat of the fryer and the size of an inverter used in the power supply. However, if the frequency is smaller than 5 kHz, a desired electric field strength cannot be obtained at the center of the oil vat regardless of the magnitude of the applied voltage or the size of the oil vat of the fryer, whereas if the frequency exceeds 20 kHz, not only does the efficiency decrease, but the possibility of the occurrence of electromagnetic interference increases. Therefore, the frequency is preferably in the range of 5 kHz to 20 kHz.

The voltage of the alternating current applied to the electrode can be determined taking into consideration factors such as the size of the oil vat of the fryer and the withstand voltage of wires connecting the power supply to the electrode. However, if the applied voltage is less than 2 kV, a desired electric field cannot be obtained at the center of the oil vat regardless of the applied frequency or the size of the oil vat of the fryer, while if the applied voltage exceeds 20 kV, not only does electrical insulation of the electrode become difficult, but the possibility of electromagnetic interference being produced increases. Therefore, the applied voltage is preferably in the range of 2 kV to 20 kV.

The present invention can reduce the amount of oil which needs to be discarded during frying by suppressing deterioration of oil, but in addition, productivity can be increased by shortening the frying time. Furthermore, the present invention makes it possible to achieve good quality frying to a uniformly fried state, and to reduce the amount of acrylamide, which is harmful to humans and which is produced when frying foods containing large amount of carbohydrates, such as potatoes.

BRIEF DESCRIPTION OF THE DRAWINGS

FIG. 2 is a schematic perspective view of a fryer equipped with an embodiment of an electric field forming apparatus according to the present invention.

FIG. 3 is a schematic perspective view showing the structure of the electrode used in the embodiment of FIG. 2.

DESCRIPTION OF PREFERRED EMBODIMENTS

Figure 1A:
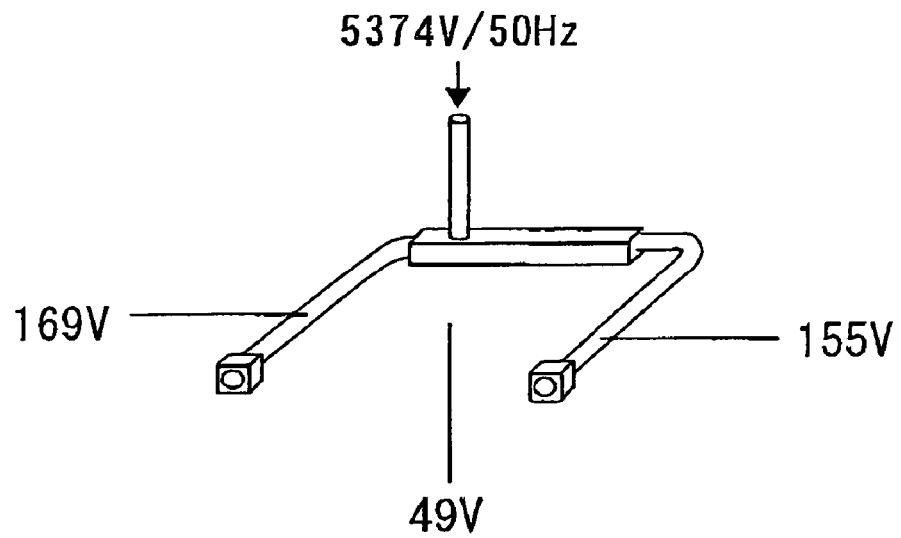
FIGS. 1A and 1B are schematic perspective views of an electrode for use in the present invention installed in an oil vat of a fryer, FIG. 1A showing the electric field strength at various locations when an AC voltage at a power line frequency of 50 Hz is applied to the electrode, and FIG. 1B showing the electric field strength when an AC voltage in the kilohertz range is applied to the electrode.

Below, a number of preferred embodiments of the present invention will be described while referring to the accompanying drawings.

FIG. 2 shows a stationary fryer equipped with an embodiment of an electric field forming apparatus according to the present invention. The fryer F itself may be of conventional structure, so it will not be described in detail. Briefly, the fryer F is equipped with an oil vat 1 and a heater 3 disposed inside the oil vat 1 below a partition 2 (a screen for preventing food from falling to the bottom of the oil vat 1). The heater 3 is typically controlled by an unillustrated control circuit so as to maintain the oil in the oil vat 1 at a prescribed frying temperature.

The illustrated embodiment of an electric field forming apparatus according to the present invention comprises an elongated electrode 5 disposed inside the oil vat 1 along one or more of the walls of the oil vat 1, and a power supply 7 which applies an alternating current voltage having a frequency higher than a power line frequency to the electrode 5. The power supply 7 is not limited to any particular structure. In this embodiment, it includes a rectifying circuit RC which converts alternating current which is input thereto (typically at a power line frequency of 50 or 60 Hz) into direct current, an inverter INV which converts this direct current into alternating current at 5 kHz to 20 kHz (preferably around 12 kHz), and a transformer TR which converts the alternating current voltage output from the inverter INV into a high voltage of 5-20 kV (preferably around 17 kV). The high voltage which is output from the transformer TR is applied to the electrode 5 through a wire 8.

Figure 1B:
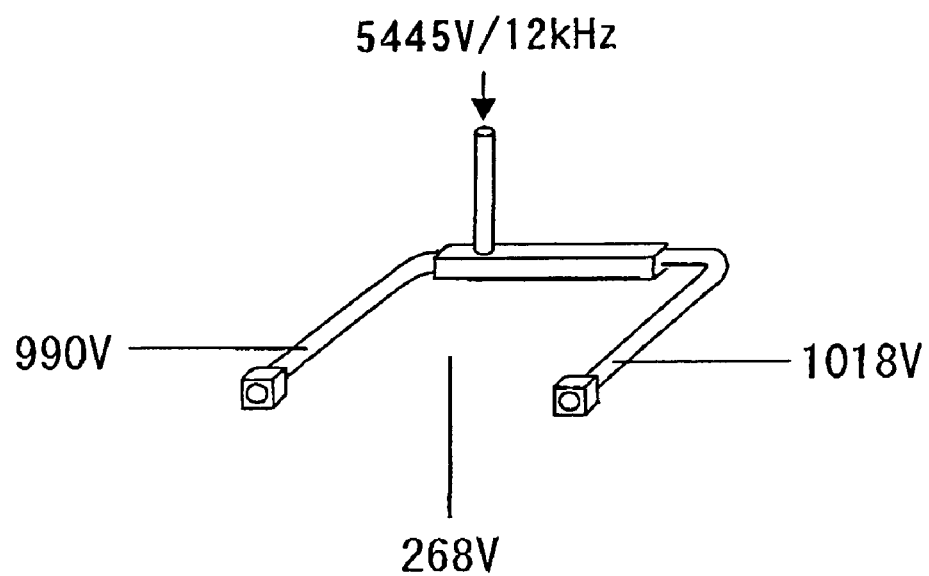
Figure 5:
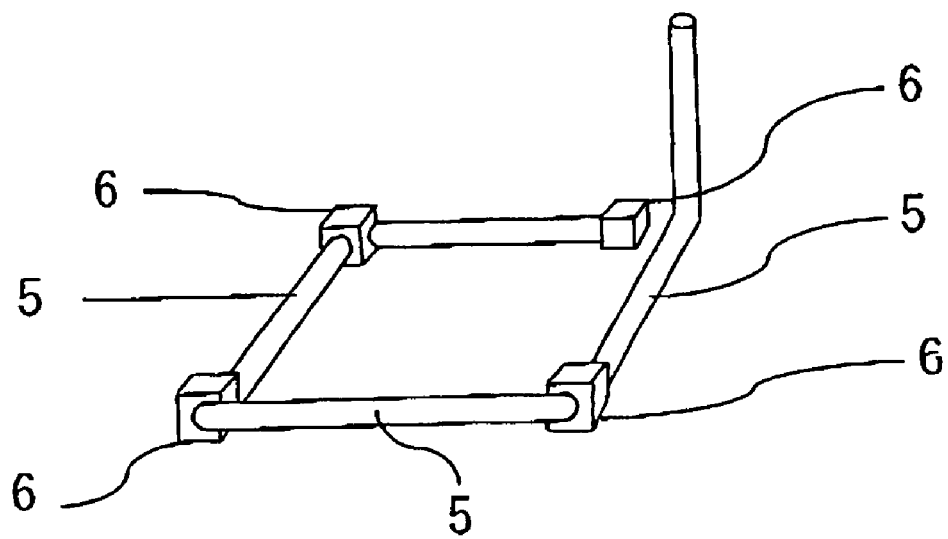
FIG. 5 is a schematic perspective view showing another example of an electrode which can be used in the present invention.

As shown in FIG. 3, the electrode 5 of the embodiment of FIG. 2 comprises an elongated metal rod 5a which is coated on its entire periphery with an electrically insulating layer 5b made from a material such as Teflon having excellent heat resistance and oil resistance. A plurality of electrically insulating support members such as support blocks 6 for supporting the electrode 5 are integrally formed with the insulating layer 5b from a material such as Teflon having excellent heat resistance and oil resistance. In this embodiment, as shown in FIG. 2, the electrode 5 comprises two sections which are connected to each other by a connector 5c and are connected to the wire 8 by the connector 5c. Each section has a right angle bend formed therein so that the electrode 5 as a whole has roughly the shape of a U. The connector 5c is also coated with an electrically insulating layer made from a material such as Teflon having excellent heat resistance and oil resistance. In this manner, the entire electrode 5 is coated with an insulating layer. As a result, excessive current from the electrode 5 is prevented, and an operator of the fryer F can be protected against electrical shocks. As shown in FIGS. 1A and 1B, the connector 5c may be combined with one or more support blocks 6 to form a single member which serves to connect the sections of the electrode 5 to each other as well as to support the electrode 5. The electrode 5 does not need to be divided into multiple sections, and as shown in FIG. 5, the electrode may be a one-piece member including a single metal rod which is bent at a plurality of locations to define a rectangular lower portion and a vertically extending upper portion for electrically connecting the lower portion to a power supply. An electrically insulating layer and support blocks 6 may be formed on the metal rod from Teflon or similar material. Since the electrode of FIG. 5 is formed from a single metal rod, the manufacturing costs of the electrode can be reduced. In this embodiment, the metal rod 5a has a circular cross section, which is advantageous in that an insulating layer can be easily formed atop it, but the metal rod 5a may have a noncircular cross section, such as one which is polygonal (rectangular, triangular, etc.) or elliptical. The illustrated support blocks 6 have a rectangular cross sectional shape, but they may have any shape which enables them to stably support the electrode 5.

The electrode 5 is disposed so as to extend along the side walls of the oil vat 1 and along the periphery of the partition 2. The electrode 5 is separated by the support blocks 6 from the side walls of the oil vat 1 and from the partition 2 by a sufficient distance that a high electric field strength is obtained in the oil vat 1 without the electric field being absorbed by the side walls of the oil vat 1 or by the partition 2. The support blocks 6 may rest atop the partition 2 without being secured thereto to enable the electrode 5 to be easily removed from the oil vat 1 for cleaning.

In the power supply 17 of this embodiment of an electric field forming apparatus according to the present invention, the inverter INV generates a high frequency alternating current, so the transformer TR can be small in size. As a result, the overall size of the power supply can be made small, and the power supply can be manufactured at a low cost.

In addition, frying time can be shortened by applying a high frequency, high voltage alternating current to the electrode 5. Shortening of the frying time, i.e., promoting heat transmission to food is related to the frequency of the applied voltage, so a high frequency is preferred. However, as stated above, if the frequency exceeds 20 kHz, not only does efficiency decreases, but the possibility of the occurrence of electromagnetic interference increases, so the frequency is preferably in the range of 5 kHz to 20 kHz.

The effect of the application of a high frequency electric field on shortening frying time was confirmed by a frying experiment using sweet potatoes. In the experiment, a high voltage alternating current at a voltage of approximately 5 kV and a frequency of 12 kHz was applied to an electrode like the one shown in FIG. 1B. Sweet potatoes were sliced into either large or small disk-shaped pieces. The large pieces weighed approximately 40 grams each and the small ones weighed approximately 25 grams each. A temperature sensor which measured the temperature at the center of a piece was mounted on each piece, and the pieces were then placed into frying oil heated to an average temperature of 175-180° C. Frying was carried out while either applying a high voltage alternating current to the electrode or without applying an alternating current. The time required for the temperature at the center of each piece to reach 80° C. (a time which is nearly proportional to the time required for adequate frying) was measured. For the large pieces of sweet potato, the time required for the centers of the pieces to reach 80° C. was 591 seconds when a high voltage alternating current was not applied and was 436 seconds, or 26.2% shorter, when a high voltage alternating current was applied. For the small pieces of sweet potato, the time required for the centers of the pieces to reach 80° C. was 411 seconds when a high voltage alternating current was not applied and was 319 seconds, or 22.2% shorter, when a high voltage alternating current was applied.

In the above-described embodiments, the electrode 5 has an elongated shape and is disposed along an inner wall of the oil vat 1. By employing this disposition of the electrode, in contrast to a conventional apparatus in which an electrode spreads over the entire bottom surface of an oil vat, adhesion of food to the electrode can be prevented, and concentrated heating which is uniform through the food being fried due to efficient thermal convection becomes possible, outflow of moisture from the food is suppressed, and oxidation of oil due to outflow of moisture is greatly suppressed.

In a conventional fryer not employing an electric field, the oxidation number after around 60 hours of cooking is at least 3.0 and exceeds the usable limit of 2.5. However, with a fryer equipped with an electric field forming apparatus of this embodiment, after even 120 hours of cooking, the oxidation number was maintained at 1.0 or less. Furthermore, in a fryer equipped with an electric field forming apparatus of this embodiment, the oxidation number did not increase even when heating was further continued. Subsequently, it was necessary to supplement the oil in the oil vat, which decreased in amount due to adsorption or evaporation, but it was not necessary to replace the existing oil.

The effect of the application of a high frequency electric field on reducing the amount of acrylamide produced through frying of carbohydrate-containing food was confirmed by a frying experiment using potatoes produced in Hokkaido, Japan. In the experiment, potatoes were cut into rectangular blocks weighing 180 grams each, and the blocks were placed into 3 kg of salad oil (sold by Nisshin Seiyu of Tokyo, Japan) heated to about 170° C. while either applying a high voltage alternating current to an electrode disposed in the oil or without applying an alternating current. When a high voltage alternating current was not applied to the electrode, the frying was completed after 5 minutes and 16 seconds, the weight of the blocks of fried potatoes was 120 grams, and the average concentration of acrylamide in the blocks was 0.86 ppm. In contrast, when a high voltage alternating current was applied to the electrode, frying was completed after 4 minutes and 57 seconds, the weight of the blocks of fried potatoes was 130 grams, and the average concentration of acrylamide was 0.51 ppm, which is about 60% of the concentration in the former case.

Figure 4:
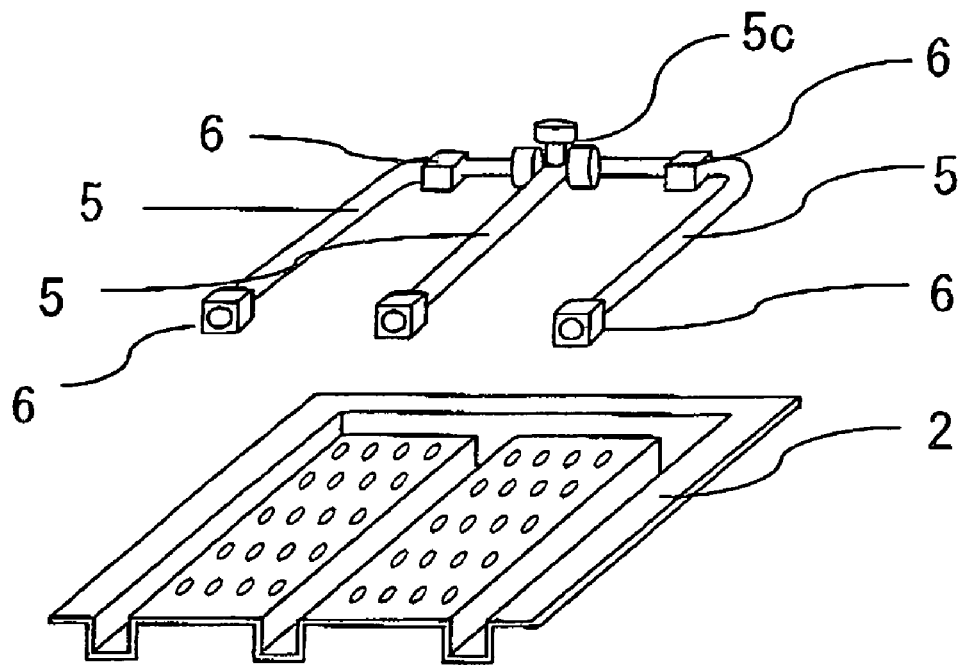
FIG. 4 is a schematic perspective view showing the structure of an electrode and a partition for use with a wide oil vat for a fryer.

FIG. 4 shows the structure of an example of an electrode 5 suitable for use in a fryer having a large oil vat and a partition 2 (a screen for preventing food from falling to the bottom of the oil vat) disposed in the lower portion of the interior of the oil vat. A recess for housing the electrode 5 is formed in the partition 2, and the electrode 5 is supported in the recess by support blocks 6 so as not to contact any of the interior surfaces of the recess. The support blocks 6 may be disposed loosely inside the recess without being secured thereto to enable the electrode 5 to be easily removed from the recess for cleaning or replacement. With this structure, an electric field can be formed over a wide range even in a broad oil vat. In addition, since the electrode 5 is housed in the recess in the partition 2, the electrode 5 does not need to protrude above the top surface of the partition 2, so the partition 2 can be easily cleaned to remove fried particles which have fallen onto the partition 2 without the cleaning tool contacting the electrode 5.

Figure 6A:
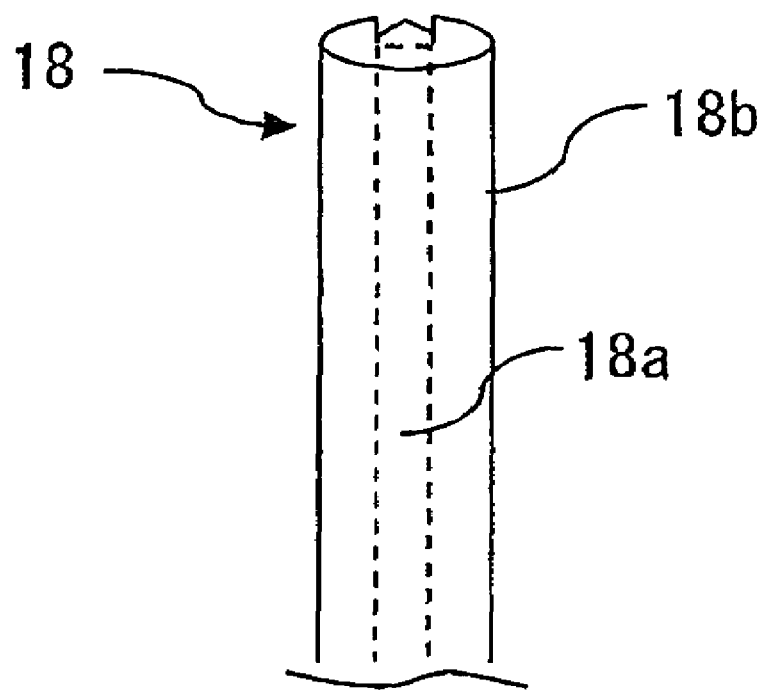
FIGS. 6A and 6B are a schematic perspective view and a schematic end view, respectively, of an example of an electrode suitable for use in a continuous fryer.
Figure 6B:
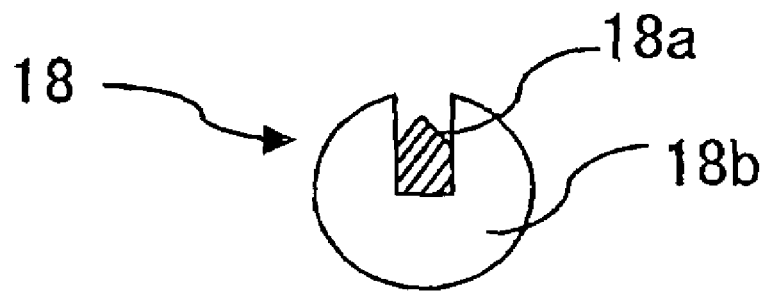

FIGS. 6A and 6B show the structure of an example of an electrode 18 suitable for use in a continuous fryer. In contrast to a stationary fryer, with a continuous fryer, since operation of the fryer is usually automated, there is almost no likelihood of the electrode being contacted by the body of an operator of the fryer during cooking operation, so the extent of electrical insulation for the electrode can be reduced to increase the electric field strength. Thus, it is not necessary for the electrically conducting portion of the electrode to be completely surrounded by electrical insulation. In this example, the electrode 18 comprises an elongated insulating body 18b and a metal rod 18a mounted in a slot formed in the insulating body 18b such that a portion of the metal rod 18a is exposed to the exterior of the electrode 18. A projection which projects towards the open end of the slot and extends in the lengthwise direction of the rod 18a may be formed on the exposed portion of the metal rod 18a. With this structure, the electric voltage is concentrated in the projection, so an electric field having a desired strength can be formed in a wide oil vat.

Figure 7:
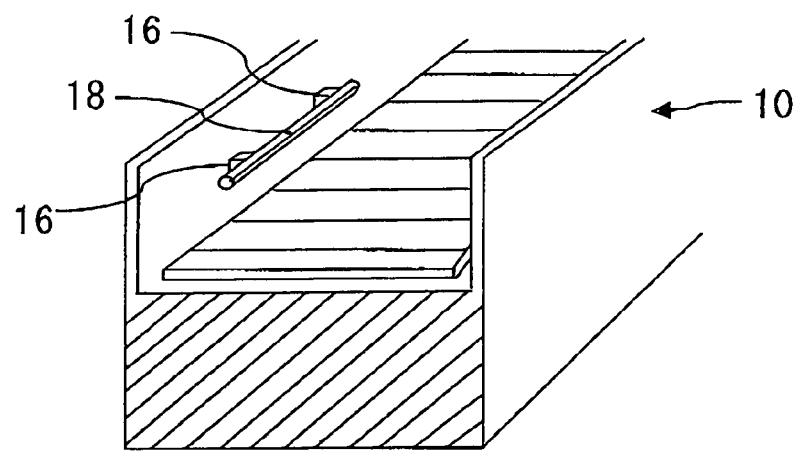
FIG. 7 is a cutaway schematic perspective view of a portion of a continuous fryer equipped with an embodiment of an electric field forming apparatus according to the present invention.
Figure 8:
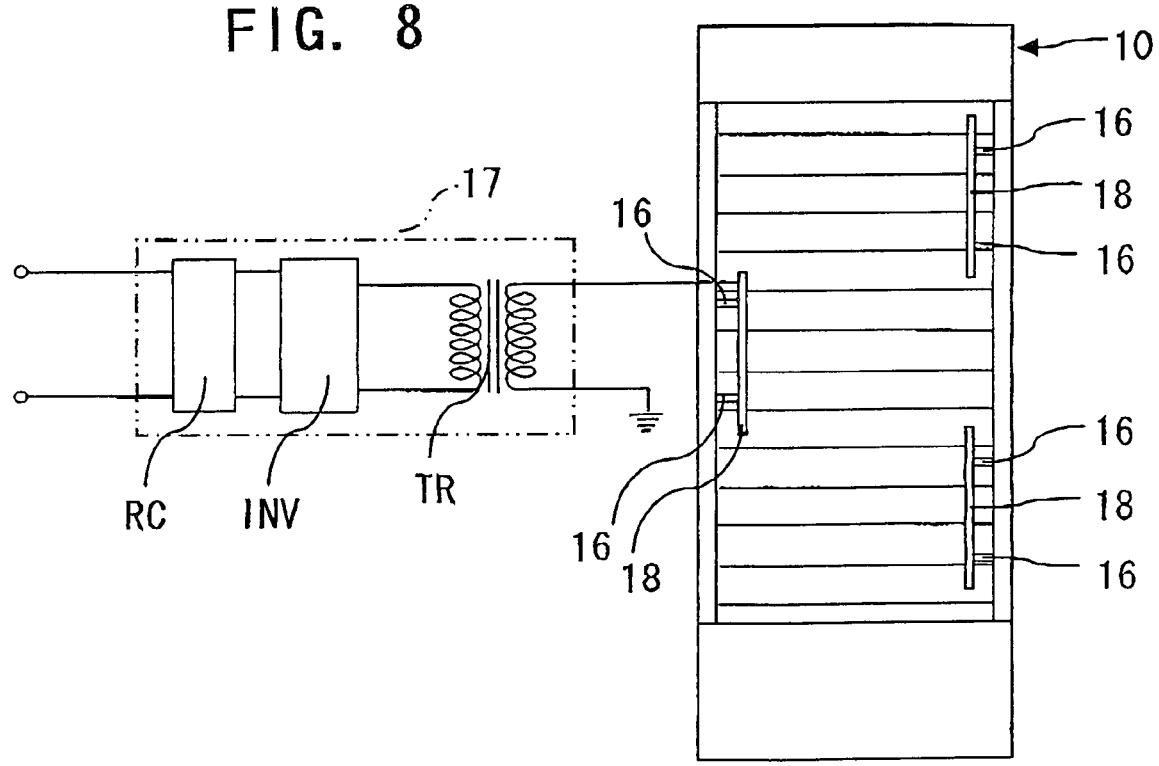
FIG. 8 is a schematic plan view of the continuous fryer of FIG. 7.

FIGS. 7 and 8 illustrate a continuous fryer equipped with a plurality of the electrodes 18 of FIGS. 6A and 6B. A prescribed number of electrodes 18 are mounted on both side walls of the oil vat 10 by means of a plurality of electrically insulating support members such as support blocks 16. Each electrode 18 extends in the lengthwise direction of the oil vat 10 and is spaced from the inner surface of the side wall on which it is mounted by the support blocks 16. The height at which the electrodes 18 are mounted on the side walls is preferably offset by a prescribed distance towards the bottom of the oil vat 10 from the center of the side walls in the heightwise direction thereof. Each electrode 18 is connected to a power supply 17 which may have the same structure as the power supply 7 shown in FIG. 2. With this electrode structure and disposition, an electric field of a desired strength can be formed over the entirety of the interior of the oil vat 10. In the illustrated example, the oil vat 10 is equipped with three electrodes 18, but the number of electrodes, their length, their cross-sectional dimensions, and other characteristics can be varied in accordance with the size of the oil vat 10. In the illustrated example, the metal rod 18a of each electrode 18 has a cross section with a roughly pentagonal shape, but the metal rod 18a may have a different polygonal shape (such as a triangular or rectangular shape), or it may have a circular, elliptical, or otherwise curved cross section.

In a continuous fryer, a conveyor is provided in the bottom portion of the oil vat. With a conventional electric field forming apparatus, it was difficult from a structural standpoint to form an electric field by disposing a flat electrode on the bottom surface of an oil vat of a continuous fryer. However, the embodiment of FIGS. 7 and 8 employs elongated electrodes 18, so it is easy to form an electric field within an oil vat of a continuous fryer.

What is claimed is:

1. An electric field forming apparatus for use in a food fryer having an oil vat, a heater disposed in the oil vat, and a horizontal partition having openings through which oil can pass disposed in the oil vat above the heater, the field forming apparatus comprising an elongated electrode which is supported in the oil vat by the partition and separated from the heater by the partition, a plurality of electrically insulating support members which are supported by the partition and which support the electrode while preventing it from contacting the wall of the oil vat or the partition, and an alternating current power supply which has an output frequency in a kHz range and which is electrically connected to the electrode.

2. An electric field forming apparatus for a fryer as claimed in claim 1 wherein the electrode comprises an elongated metal rod which is covered with an insulating layer.

3. An electric field forming apparatus for a fryer as claimed in claim 1 wherein the electrode is housed in a recess in the partition and is supported by the electrically insulating support members so as not to contact an inner surface of the recess.

4. An electric field forming apparatus for a fryer as claimed in claim 1 wherein the electrode comprises an elongated metal rod which is disposed inside an electrically insulating body and which has an exposed portion which is exposed to an exterior of the electrode.

5. An electric field forming apparatus for a fryer as claimed in claim 4 wherein a projection which projects towards the exterior of the electrode is formed on the exposed portion of the metal rod.

6. An electric field forming apparatus for a fryer as claimed in claim 2 wherein the insulating layer and the support members are made of polytetrafluoroethylene.

7. An electric field forming apparatus for a fryer as claimed in claim 4 wherein the insulating body and the support members are made of polytetrafluoroethylene.

8. An electric field forming apparatus for a fryer as claimed in claim 1 wherein the power supply has an output frequency in the range of 5 kHz to 20 kHz.

9. An electric field forming apparatus for a fryer as claimed in claim 1 wherein the power supply has an output voltage in the range of 2 kv to 20 kv.

10. An electric field forming apparatus for a fryer as claimed in claim 1 wherein the power supply includes an inverter.

11. A fryer comprising an oil vat, a heater for heating oil in the oil vat, and an electric field forming apparatus for a fryer as claimed in claim 1 having its electrode disposed in the oil vat.

12. A method of frying food using an electric field forming apparatus as claimed in claim 1 comprising placing food into heated oil in an oil vat of a fryer containing the electrode of the electric field forming apparatus and applying an alternating current having a frequency in the kHz range to the electrode with the alternating current power supply.

13. A method as claimed in claim 12 including applying an alternating current having a frequency in a range of 5 kHz to 20 kHz to the electrode.

14. An electric field forming apparatus as claimed in claim 1 wherein the electrode extends horizontally along a wall of the oil vat.

15. An electric field forming apparatus as claimed in claim 1 wherein the electrode extends horizontally along a plurality of walls of the oil vat.

16. An electric field forming apparatus as claimed in claim 1 wherein a portion of the electrode extends horizontally into a central region of the oil vat spaced from walls of the oil vat.

17. An electric field forming apparatus as claimed in claim 3 wherein the electrode is disposed in the recess so as not to protrude above a top surface of the partition.

* * * * *

UNITED STATES PATENT AND TRADEMARK OFFICE
CERTIFICATE OF CORRECTION

PATENT NO.       : 7,654,196 B2                                          Page 1 of 1
APPLICATION NO.  : 11/243178
DATED            : February 2, 2010
INVENTOR(S)      : Uchikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this

Twenty-third Day of November, 2010

David J. Kappos
*Director of the United States Patent and Trademark Office*